US009180734B2

(12) United States Patent
Toda et al.

(10) Patent No.: US 9,180,734 B2
(45) Date of Patent: Nov. 10, 2015

(54) MACHINING TOOL FOR VEHICLE HUB UNIT AND VEHICLE HUB UNIT

(75) Inventors: Takuya Toda, Kashiwara (JP); Takaaki Onizuka, Kashiwara (JP); Katsuyuki Harada, Yamatokoriyama (JP)

(73) Assignee: JTEKT CORPORATION, Osaka (JP)

( * ) Notice: Subject to any disclaimer, the term of this patent is extended or adjusted under 35 U.S.C. 154(b) by 424 days.

(21) Appl. No.: 13/446,713

(22) Filed: Apr. 13, 2012

(65) Prior Publication Data

US 2012/0267944 A1  Oct. 25, 2012

(30) Foreign Application Priority Data

Apr. 21, 2011 (JP) ................................. 2011-094853

(51) Int. Cl.
*B60B 27/00* (2006.01)
*F16D 1/076* (2006.01)
*F16D 3/223* (2011.01)

(52) U.S. Cl.
CPC ............ *B60B 27/0031* (2013.01); *F16D 1/076* (2013.01); *B60B 27/0005* (2013.01); *B60B 27/0036* (2013.01); *F16D 2003/22326* (2013.01)

(58) Field of Classification Search
CPC .. B60B 27/00; B60B 27/0005; B60B 27/001; B60B 27/0026; B60B 27/0036; B60B 27/0042
USPC ........................................ 301/105.1; 384/544
See application file for complete search history.

(56) References Cited

U.S. PATENT DOCUMENTS

| 4,744,263 | A | * | 5/1988 | Kuiken | ............................ | 74/462 |
| 5,845,533 | A | * | 12/1998 | Basstein et al. | .................. | 74/462 |
| 8,246,256 | B2 | * | 8/2012 | Langer et al. | .................. | 384/544 |
| 8,444,322 | B2 | * | 5/2013 | Langer et al. | .................. | 384/544 |
| 2007/0125148 | A1 | | 6/2007 | Dohmann et al. | | |
| 2008/0175526 | A1 | | 7/2008 | Langer et al. | | |
| 2010/0038958 | A1 | | 2/2010 | Tsuzaki et al. | | |
| 2011/0285196 | A1 | * | 11/2011 | Kamikawa et al. | ......... | 301/105.1 |
| 2012/0049611 | A1 | * | 3/2012 | Harada et al. | .................. | 301/109 |

FOREIGN PATENT DOCUMENTS

| DE | 10 2005 009 938 A1 | 9/2006 |
| DE | 10 2007 053 728 A1 | 6/2009 |
| EP | 2 284 021 A1 | 2/2011 |
| JP | 2007-509761 A | 4/2007 |

(Continued)

OTHER PUBLICATIONS

Extended European Search Report issued in European Patent Application No. 12164416.5 on Apr. 29, 2013.

(Continued)

*Primary Examiner* — Jason Bellinger
(74) *Attorney, Agent, or Firm* — Oliff PLC

(57) ABSTRACT

In a machining tool, multiple tooth forming portions for plastically forming spline teeth on an axial end face of a vehicle hub unit, the axial end face facing inward in the vehicle lateral direction, are formed in a circular pattern about the central axis of the machining tool. In the machining tool, a rounded-portion forming portion is formed to form a rounded portion between a tooth flank and a top land of each spline tooth, and the radius of the rounded-portion forming portion gradually changes in the radial direction about the central axis.

2 Claims, 11 Drawing Sheets

(56) References Cited

FOREIGN PATENT DOCUMENTS

| | | |
|---|---|---|
| JP | A-2008-174178 | 7/2008 |
| JP | A-2008-536737 | 9/2008 |

OTHER PUBLICATIONS

Jan. 27, 2015 Office Action issued in Japanese Patent Application No. 2011-094853.

* cited by examiner

F I G . 7
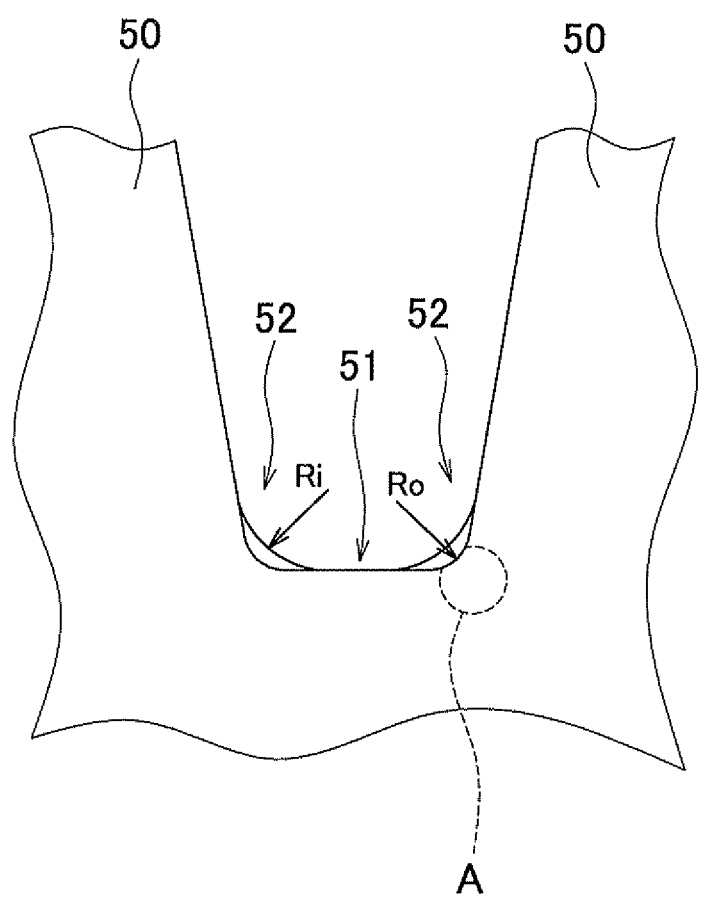

MACHINING TOOL FOR VEHICLE HUB UNIT AND VEHICLE HUB UNIT

INCORPORATION BY REFERENCE

The disclosure of Japanese Patent Application No. 2011-094853 filed on Apr. 21, 2011 including the specification, drawings and abstract, is incorporated herein by reference in its entirety.

BACKGROUND OF THE INVENTION

1. Field of the Invention

The invention relates to a machining tool for a vehicle hub unit, and a vehicle hub unit. More specifically, the invention relates to a machining tool for forming spline teeth on an axially inner end face of a hub wheel to which a wheel is fitted, and a vehicle hub unit in which the spline teeth are formed.

2. Description of Related Art

A hub unit is used to support a wheel of a motor vehicle such that the wheel is rotatable with respect to a suspension device. As a hub unit of this type, there is a conventional hub unit in which spline teeth (side face splines), to be meshed with teeth formed on an outer ring of a constant velocity joint, are formed on an axially inner end face (an end face that faces inward in the vehicle lateral direction) of a hub wheel to which a drive wheel is fitted (refer to, for example, Published Japanese Translation of PCT Application No. 2008-536737).

Spline teeth of a hub wheel are usually formed plastically with the use of a punch (machining tool) having tooth forming portions. The punch is formed in a substantially cylindrical shape, and multiple tooth forming portions are formed on one axial end face thereof so as to be arranged in a circular pattern. Then, the tooth forming portions of the punch are pressed against an axial end face of the hub wheel to transfer the shapes of the tooth forming portions to the axial end face of the hub wheel. In this way, the spline teeth are formed.

When the tooth forming portions of the punch are pressed against the axial end face of the hub wheel to plastically form the spline teeth, large stress is produced in the tooth forming portions. If such large stress is repeatedly produced, the tooth forming portions may break due to fatigue. If the tooth forming portions break soon, the manufacturing costs, of course, increase, and a product price reflects the increase in manufacturing costs. Therefore, it is desired that stress that is produced in the tooth forming portions be reduced to increase the durability of the punch.

In order to increase the durability of the tooth forming portions of the punch, the shape of each tooth forming portion may be changed into such a shape that stress concentration is less likely to occur. However, the shapes of the tooth forming portions are directly transferred to the spline teeth. Therefore, a change in the shape of each tooth forming portion directly influences the shape of each spline tooth. Accordingly, it is extremely important to design the shape of each tooth forming portion such that stress that is produced in the tooth forming portions is reduced while ensuring sufficient strength and durability of the spline teeth.

SUMMARY OF THE INVENTION

It is an object of the invention to provide a machining tool for a vehicle hub unit, which makes it possible to ensure, in a balanced manner, both the durability of tooth forming portions of a punch (machining tool) and the durability of spline teeth formed by the punch, and a vehicle hub unit.

A first aspect of the invention relates to a machining tool in which multiple tooth forming portions for plastically forming spline teeth on an axial end face of a vehicle hub unit, the axial end face facing inward in the vehicle lateral direction, are formed in a circular pattern about the central axis of the machining tool. In the machining tool, a rounded-portion forming portion that has an arc-shape is formed at a root portion of each of the tooth forming portions, and is used to form a rounded portion between a tooth flank and a top land of each spline tooth. The radius of the rounded-portion forming portion gradually changes in the radial direction about the central axis.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a view that schematically shows a root portion of a tooth forming portion;

DETAILED DESCRIPTION OF EMBODIMENTS

Hereafter, a method of manufacturing a vehicle hub unit according to an embodiment of the invention will be described in detail with reference to the accompanying drawings.

Figure 1:
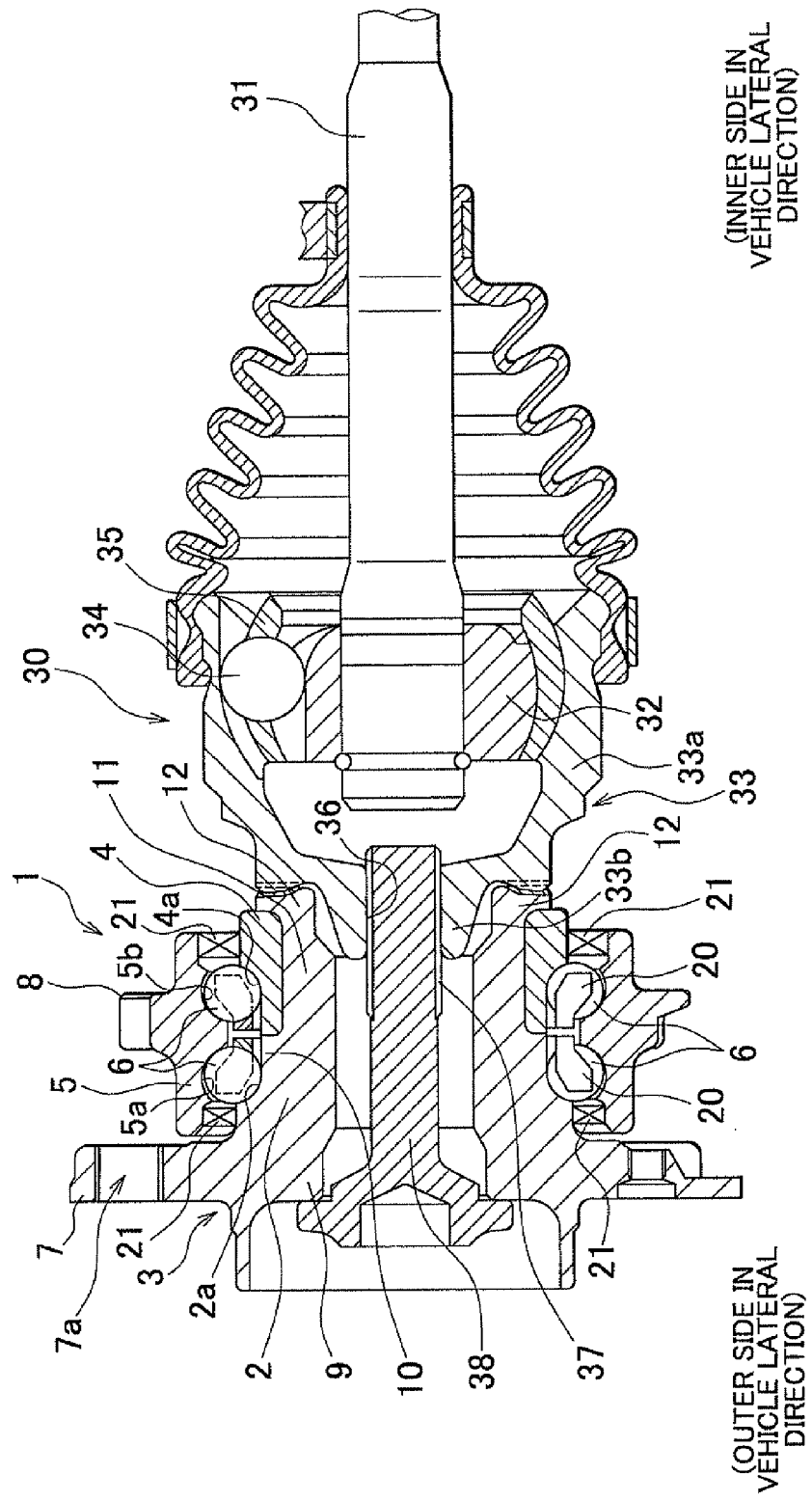
FIG. 1 is a sectional view of an example of a vehicle hub unit according to an embodiment of the invention.
Figure 2:
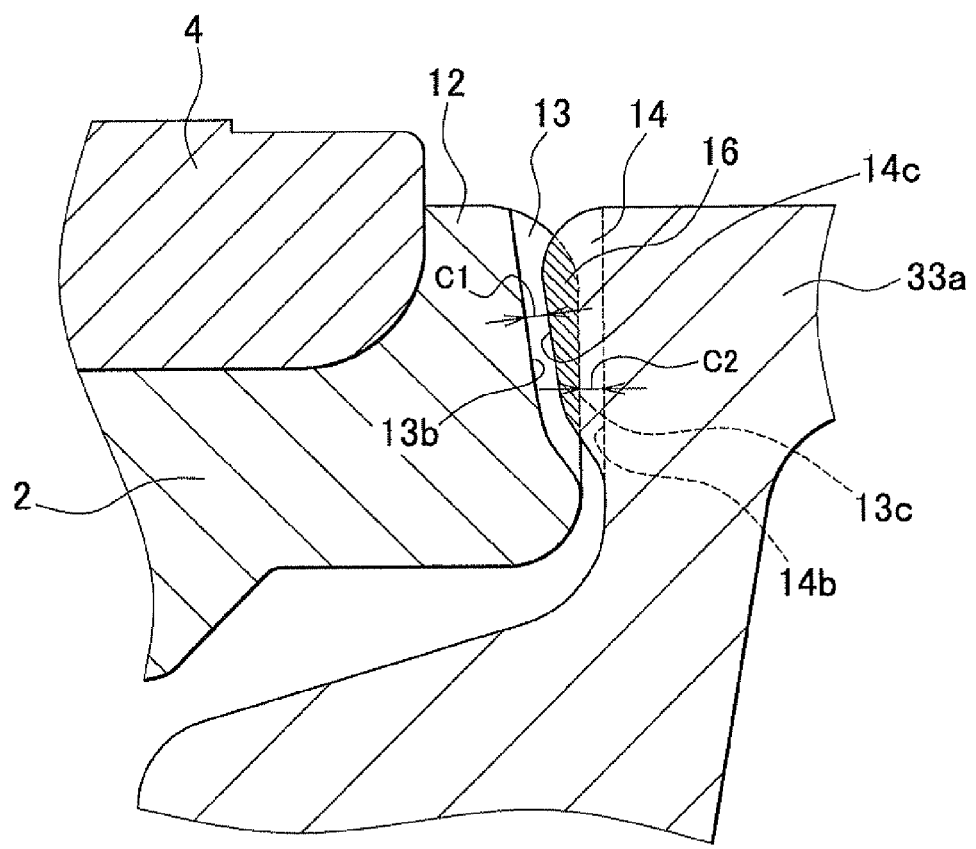
FIG. 2 is an enlarged view of an end portion of a clinched portion of the vehicle hub unit shown in FIG. 1.

The structure of a vehicle hub unit 1 will be described below. FIG. 1 is a sectional view of an example of the vehicle hub unit 1 according to an embodiment of the invention. FIG. 2 is an enlarged view of an end portion of a clinched portion of the vehicle hub unit 1. The vehicle hub unit 1 supports a wheel of a motor vehicle such that the wheel is rotatable with respect to a suspension device. The vehicle hub unit 1 includes a hub wheel 3, an inner ring member 4, an outer ring 5 and a plurality of rolling elements 6. The hub wheel 3 has a cylindrical hub spindle 2. The inner ring member 4 is fitted to an inner end portion (an end portion that faces outward in the vehicle lateral direction; a right end portion in FIG. 1) of the hub spindle 2, and fixed by a clinched portion 12. The outer ring 5 is arranged at a position radially outward of the hub spindle 2. The rolling elements 6 are rollably arranged between an outer ring raceway 5a of an inner peripheral face of the outer ring 5 and an inner ring raceway 2a of an outer peripheral face of the hub spindle 2, and between an outer ring raceway 5b of the inner peripheral face of the outer ring 5 and an inner ring raceway 4a of an outer peripheral face of the inner ring member 4. The rolling elements 6 are retained by a cage 20 at predetermined intervals in the circumferential direction. In addition, seal members 21 are provided in an annular space formed between the outer ring 5 and the hub wheel 3. The seal members 21 seal the annular space from both sides in the axial direction.

A flange 7 is formed at an outer end portion (an end portion that faces outward in the vehicle lateral direction; a left end portion in FIG. 1) of the hub wheel 3. The flange 7 has a hole 7a into which a bolt (not shown) is fitted. The wheel for a tire, a brake disc, and the like, are fitted to the flange 7 with bolts. In addition, a fixing flange 8 is formed on an outer peripheral face of the outer ring 5. The hub unit 1 is fitted, via the fixing flange 8, to a vehicle body-side member (not shown) supported by the suspension device of the vehicle.

The hub spindle 2 is a single-piece member having a large-diameter portion 9 and a small-diameter portion 11. The large-diameter portion 9 is formed on the flange 7-side. The small-diameter portion 11 is smaller in diameter than the large-diameter portion 9, and is formed so as to be contiguous with the large-diameter portion 9 via a step 10. The inner ring raceway 2a, which corresponds to the outer ring raceway 5a of the outer ring 5, is formed on an outer peripheral face of the large-diameter portion 9.

The inner ring member 4 is fitted to an outer peripheral face of the small-diameter portion 11 of the hub spindle 2. Then, as will be described later, the clinched portion 12 is formed by clinching an end portion of the small-diameter portion 11. In this way, the inner ring member 4 is fixed between the step 10 and the clinched portion 12.

Driving force is transmitted from a drive shaft 31 to the hub unit 1 via a constant velocity joint 30. The constant velocity joint 30 shown in the drawing is a Birfield constant velocity joint, and includes an inner ring 32, an outer ring 33, a plurality of balls 34 and a cage 35. The inner ring 32 is fixed to one end of the drive shaft 31 so as to be rotatable together with the drive shaft 31. The outer ring 33 is arranged at a position radially outward of the inner ring 32. The balls 34 are arranged between the inner ring 32 and the outer ring 33. The cage 35 retains the balls 34.

The outer ring 33 of the constant velocity joint 30 has a bowl-shaped outer ring cylindrical portion 33a and an outer ring shaft portion 33b. The outer ring shaft portion 33b extends from a center portion of an end face of the outer ring cylindrical portion 33a. The outer ring shaft portion 33b has a hole 36 that extends along the axial direction. An inner peripheral face of the outer ring shaft portion 33b, which defines the hole 36, has an internal thread. The hub unit 1 is connected to the constant velocity joint 30 with a cap bolt 38 that has an external thread 37 at its distal end portion.

As shown in FIG. 2, multiple spline teeth 13 are formed on an end face of the clinched portion 12 of the inner axial end portion of the hub spindle 2 so as to be arranged in a circular pattern about an axis O. Multiple teeth 14 are formed on an end face of the outer ring cylindrical portion 33a, which faces the clinched portion 12, so as to be arranged in a circular pattern. Due to the mesh between the spline teeth 13 and teeth 14, rotational driving force of the drive shaft 31 is transmitted to the hub unit 1 via the constant velocity joint 30. The hatched area in FIG. 2 indicates a meshing region 16 at which the spline tooth 13 is in mesh with the tooth 14 of the outer ring cylindrical portion 33a.

The number of the spline teeth 13 is, for example, 37, and the number of the teeth 14 is equal to the number of the spline teeth 13. A predetermined clearance C1 is left between a bottomland 13b between spline teeth 13 and a top land 14c of the tooth 14 of the outer ring cylindrical portion 33a, which faces the bottomland 13b. In addition, a predetermined clearance C2 is left between a top land 13c of each spline tooth 13 and a bottomland 14b between the teeth 14 of the outer ring cylindrical portion 33a, which faces the top land 13c.

Both the spline teeth 13 and the teeth 14 of the outer ring cylindrical portion 33a are formed through die forging. The predetermined clearances C1 and C2 are left such that dimensional variations caused in the die forging are absorbed so that interference between the teeth does not occur during assembly.

Figure 4A:
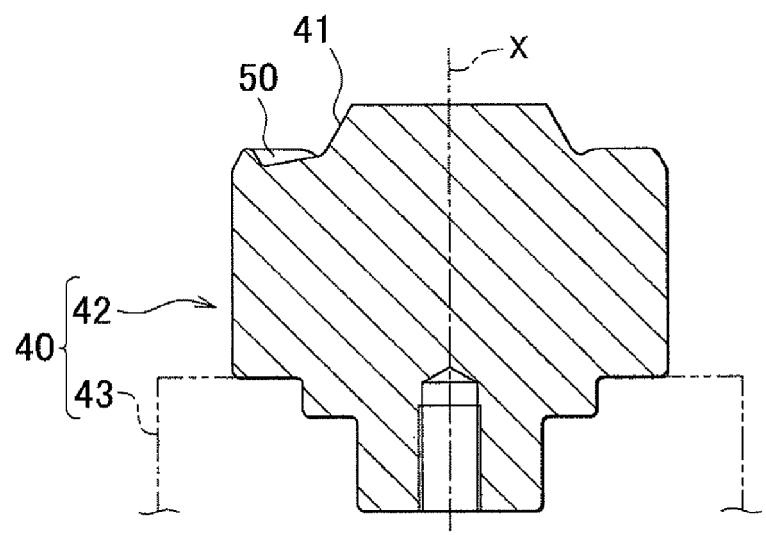
FIG. 4A and FIG. 4B are views of an example of a punch.
Figure 4B:
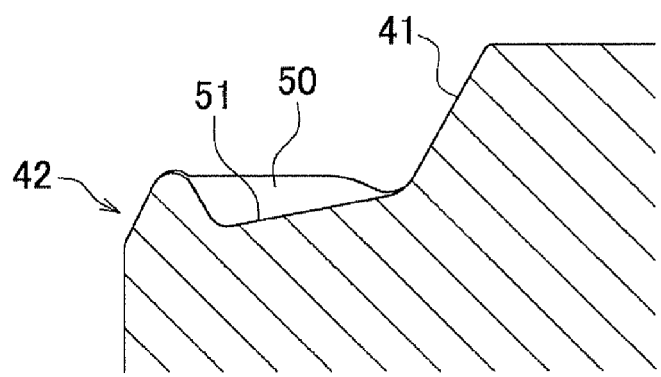

A method of manufacturing the vehicle hub unit 1 will be described below. The spline teeth 13 are formed together with the clinched portion 12 at the same time in the following manner. The inner ring member 4 is fitted to the outer peripheral face of the small-diameter portion 11 of the hub spindle 2, and then the end portion of the small-diameter portion 11 is subjected to die forging. Such die forging may be performed using a "clinching tool". FIG. 4A and FIG. 4B show an example of a clinching tool 40. The clinching tool 40 may be inserted into the end portion of the small-diameter portion 11 of the hub spindle 2. The clinching tool 40 includes a punch (machining tool) 42 and an oscillating spindle 43. The punch (machining tool) 42 has a guide portion 41 that is able to contact the end portion of the small-diameter portion 11 with a predetermined inclination angle with respect to an inner peripheral face of the end portion. The punch 42 is non-rotatably attached to the oscillating spindle 43.

Figure 5:
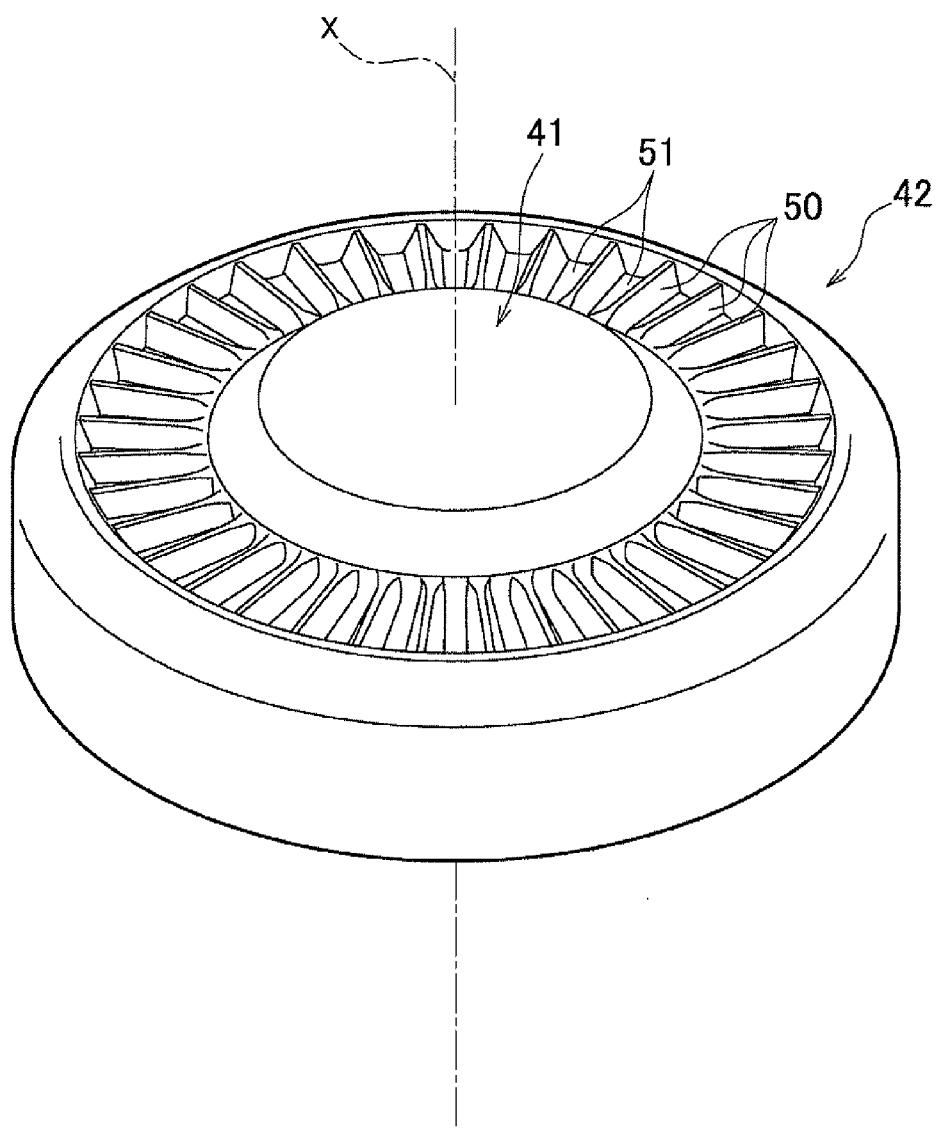
FIG. 5 is a perspective view that shows an example of the punch.

FIG. 5 is a perspective view that shows an example of the punch 42. The punch 42 is made of metal, such as tool steel, and is formed in a substantially cylindrical shape having a central axis X. The guide portion 41 is formed at the center of one axial end face of the punch 42, and protrudes in a substantially circular truncated cone shape. In addition, multiple tooth forming portions 50 for plastically forming the spline teeth 13 are formed on the one axial end face of the punch 42. The tooth forming portions 50 are formed at positions radially outward of the guide portion 41 so as to be arranged in a circular pattern.

Figure 3:
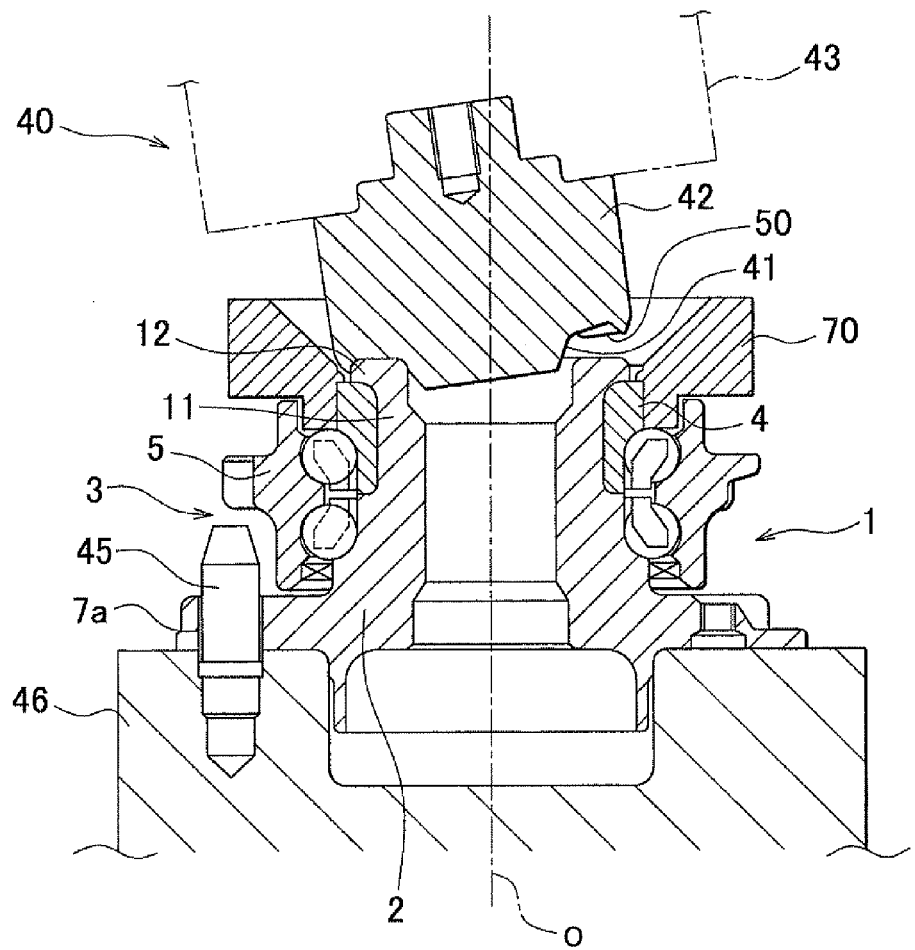
FIG. 3 is a sectional view that shows a method of manufacturing the vehicle hub unit.

FIG. 3 is a sectional view that shows a method of manufacturing the vehicle hub unit. To form the clinched portion 12 and the spline teeth 13 in the vehicle hub unit 1 using the clinching tool 40, first, as shown in FIG. 3, the hub wheel 3 is fixed to a base 46. Specifically, a knock pin 45 held upright relative to the base 46 is inserted into the hole 7a of the flange 7 while the flange 7 of the hub wheel 3 is placed, at an outer side face (a side face that faces outward in the vehicle lateral direction when the hub wheel 3 is attached to the vehicle), on an upper face of the base 46. In this way, the hub wheel 3 is fixed to the base 46.

Next, the guide portion 41 of the punch 42 of the clinching tool 40 is inserted into the small-diameter portion 11 of the hub spindle 2 of the hub wheel 3 displaced on the base 46. The punch 42 is pressed against the end portion of the small-diameter portion 11 with predetermined pressing force. At the same time, a spindle (not shown) of which the axis coincides with the axis O of the hub spindle 2 is rotated to oscillate the clinching tool 40. Through the oscillation clinching, the small-diameter portion 11 is plastically deformed radially outward and the clinched portion 12 is formed, and, at the same time, the spline teeth 13 are formed on the end face of the clinched portion 12 by the tooth forming portions 50 of the punch 42. Note that an annular restraining member 70 is arranged at a position radially outward of the inner ring member 4. The restraining member 70 is used to prevent the inner ring member 4 from deforming radially outward due to pressure applied from the punch 42 during oscillation clinching.

Next, the structure of the tooth forming portions 50 of the punch 42 will be described in more detail. As shown in FIG. 5, the tooth forming portions 50 are formed to extend radially (in a radial fashion) about the central axis X. In addition, grooves 51 are formed between the tooth forming portions 50 that are arranged in the circumferential direction.

Figure 6:
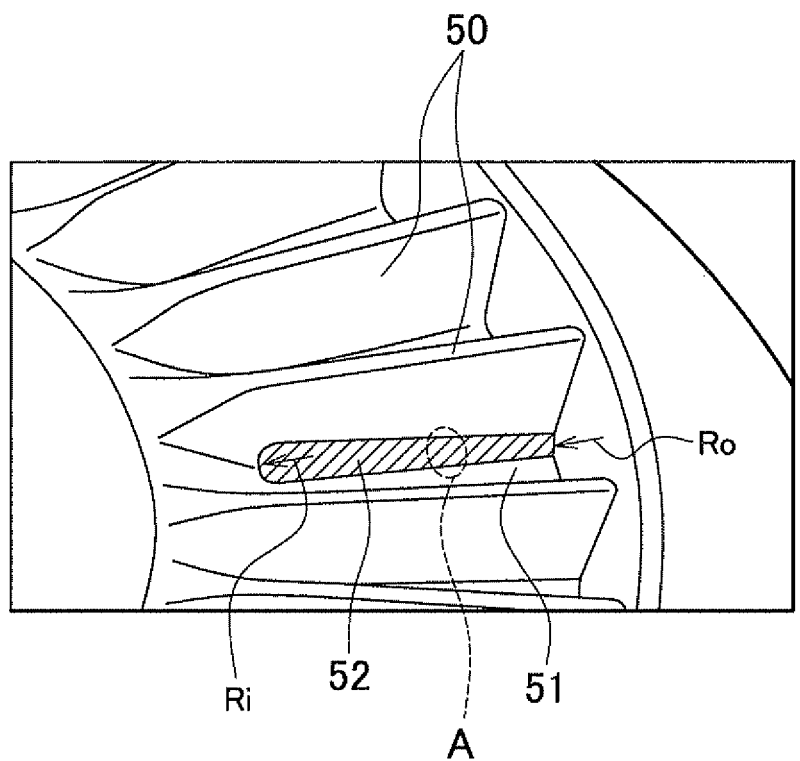
FIG. 6 is a partially enlarged perspective view of the punch.
Figure 8:
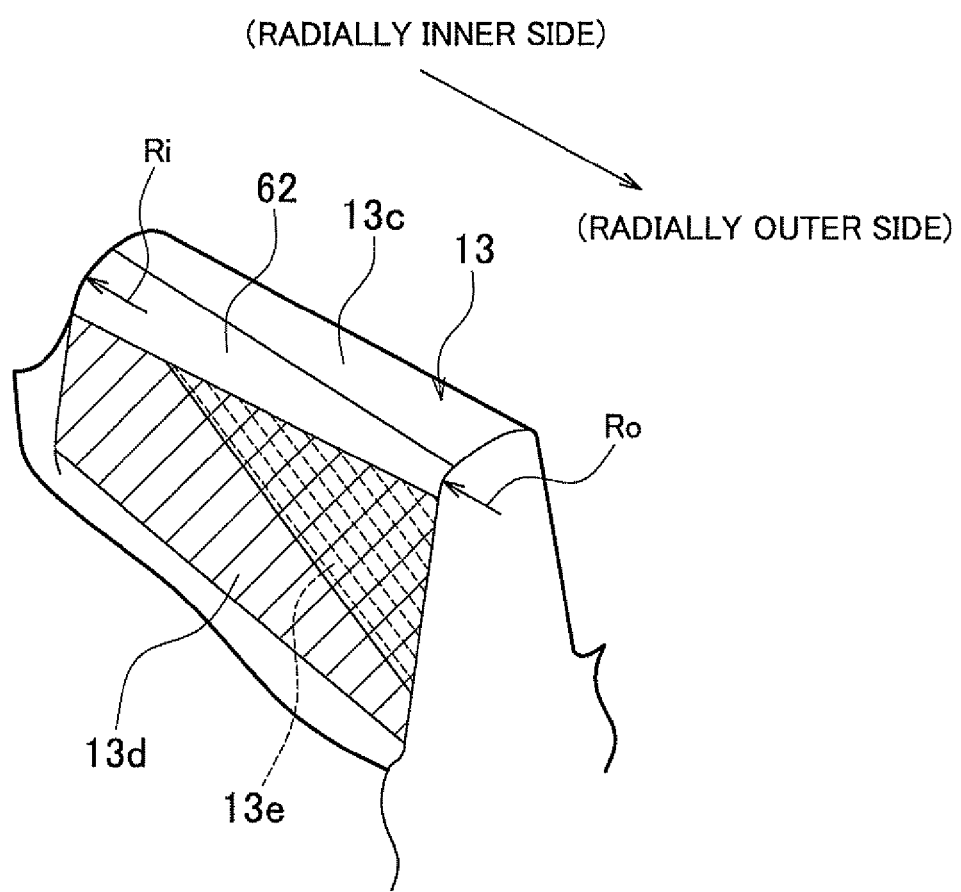
FIG. 8 is a perspective view that schematically shows an example of each spline tooth.

FIG. 6 is a partially enlarged perspective view of the punch 42. FIG. 7 is a view that schematically shows a root portion of each tooth forming portion 50. FIG. 8 is a perspective view that schematically shows an example of each spline tooth 13. The spline teeth 13 are formed by transferring the shapes of the tooth forming portions 50 of the punch 42 to one axial end face of the hub wheel 3. Specifically, each spline tooth 13 is formed between two tooth forming portions 50 that are next to each other in the circumferential direction. A rounded-portion forming portion 52 is formed between a bottom face of each groove 51 and a side face of a corresponding one of the tooth forming portions 50. The hatched area in FIG. 6 shows the range of the rounded-portion forming portion 52. The rounded-portion forming portion 52 is formed of a curved face that in an arc-shape in section. The shape of the rounded-portion forming portion 52 is transferred to form a rounded portion 62 between a tooth flank and a top land of the spline tooth 13, as shown in FIG. 8.

As shown in FIG. 6 and FIG. 7, the rounded-portion forming portion 52 of each tooth forming portion 50 gradually changes in radius (radius of curvature) in the radial direction about the central axis X (see FIG. 5). Specifically, a radius Ro of the rounded-portion forming portion 52 at a radially outer end portion is smaller than a radius Ri of the rounded-portion forming portion 52 at a radially inner end portion, and the radius of the rounded-portion forming portion 52 gradually changes from the radially outer end portion to the radially inner end portion.

As shown in FIG. 8, the rounded portion 62 of each spline tooth 13 is formed by transferring the shape of the rounded-portion forming portion 52 of the tooth forming portion 50. Therefore, a radius of a radially inner end portion and a radius of a radially outer end portion of each rounded portion 62 are equal to the radius Ri and the radius Ro of each rounded-portion forming portion 52, respectively. Thus, the radius of the rounded portion 62 is reduced from the radially inner end portion toward the radially outer end portion, that is, the radius Ro at the radially outer end portion is smaller than the radius Ri at the radially inner end portion.

As described above, when the spline teeth 13 are formed on the inner axial end face of the hub wheel 3 (the end face that faces inward in the vehicle lateral direction; the end face of the clinched portion 12), the tooth forming portions 50 of the punch 42 are pressed against the clinched portion 12 with predetermined pressing force while the punch 42 is oscillated. The stress produced in the tooth forming portions 50 at this time was subjected to finite element method (FEM) analysis, and it was found that the greatest stress concentration occurs at the rounded-portion forming portion 52 (a portion denoted by A in FIG. 6 and FIG. 7) of each tooth forming portion 50. Thus, it is considered that fatigue failure occurs at the portion A.

In the present embodiment, the radius of each rounded-portion forming portion 52 gradually changes in the radial direction, and, particularly, the radius Ri at the radially inner end portion is larger than the radius Ro at the radially outer end portion. Therefore, it is considered that the degree of stress concentration is lower and the durability of the tooth forming portions 50 is higher in the present embodiment than in the case where the radius of each rounded-portion forming portion 52 is smaller than Ro and is constant over its entire length in the radial direction.

Figure 9:
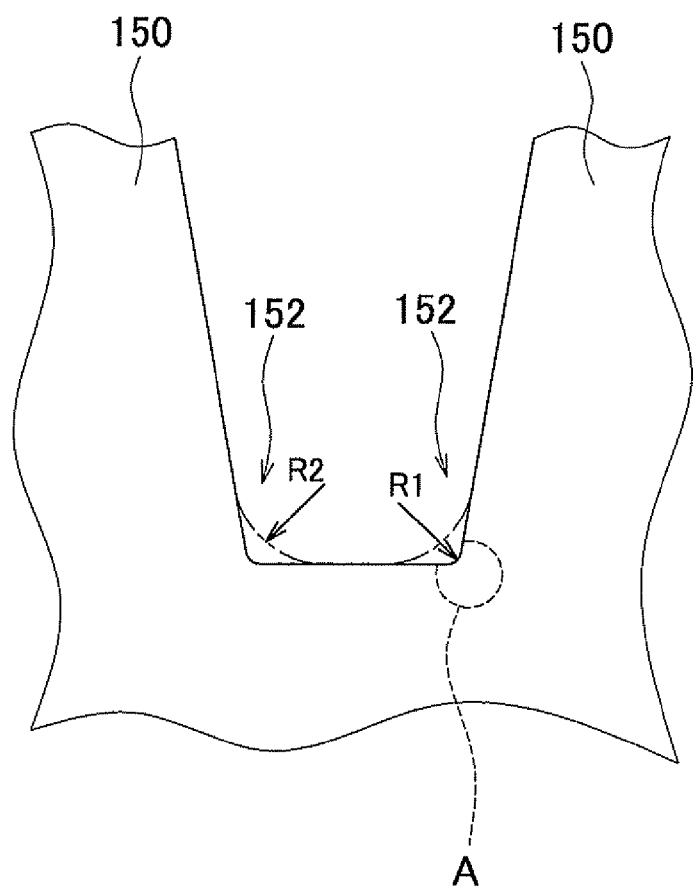
FIG. 9 is a view that schematically shows a root portion of a tooth forming portion of a punch according to first and second comparative examples.

In terms of this point, the inventors of the present application analyzed, through the above-described FEM analysis, the stress produced in the tooth forming portions 50 in the present embodiment where the radius of each rounded-portion forming portion 52 gradually changes in the radial direction and the stress produced in tooth forming portions 150 in a first comparative example where, as shown in FIG. 9, the radius of each rounded-portion forming portion 152 is constant at a value R1 (indicated by the continuous line in FIG. 9) smaller than Ro. More specifically, in the present embodiment, the radius Ri and the radius Ro of each rounded-portion forming portion 52 are respectively set at 0.80 mm and 0.45 mm, and, in the first comparative example, the radius R1 of each rounded-portion forming portion 152 is set at 0.30 mm. In addition, the material of the punch 42 was tool steel having a Young's modulus of 210 GPa and a Poisson's ratio of 0.3. As a result, it was found that the maximum principal stress produced in each rounded-portion forming portion 52 in the present embodiment was lower by about 13% than that in the first comparative example.

When the radius of each rounded-portion forming portion 52 is, for example, a value larger than Ri and is constant over its entire length in the radial direction, it is considered that the degree of stress concentration will be lower than that is the present embodiment. However, in this case, there is an inconvenience that the durability of the spline teeth 13 formed by the tooth forming portions 50 will be reduced. Hereinafter, this point will be described in detail while comparing the present embodiment, the first comparative example and another comparative example (second comparative example) to each other.

Figure 10:
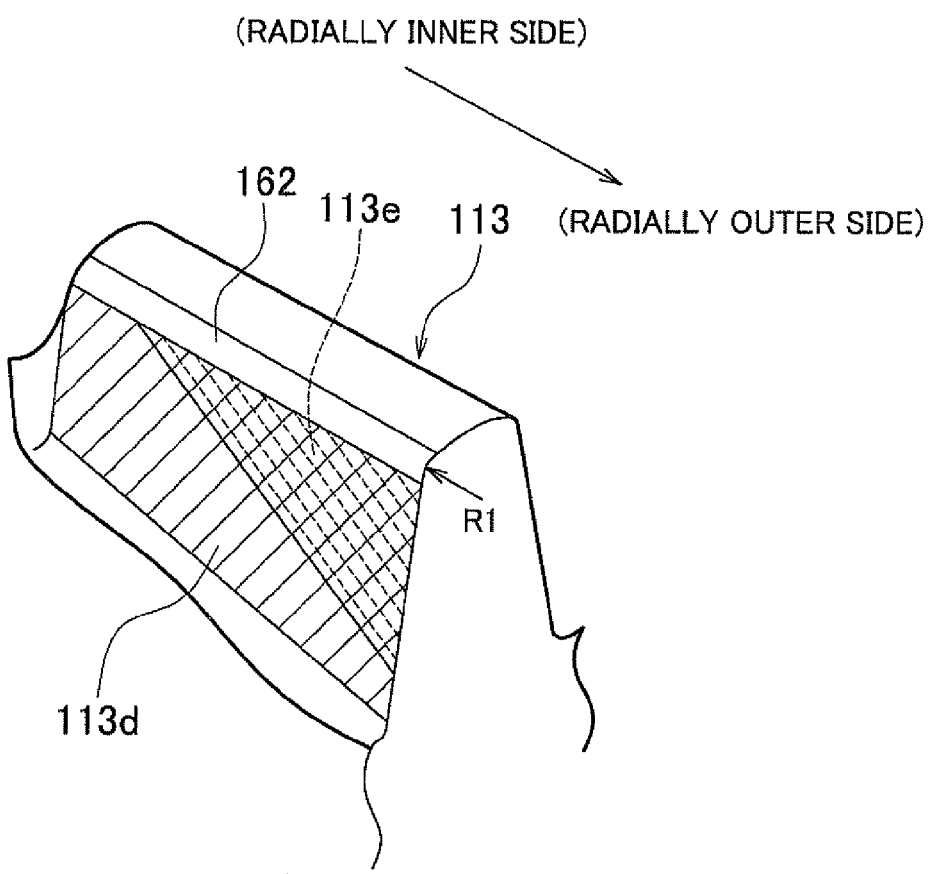
FIG. 10 is a perspective view that schematically shows each spline tooth according to the first comparative example.
Figure 11:
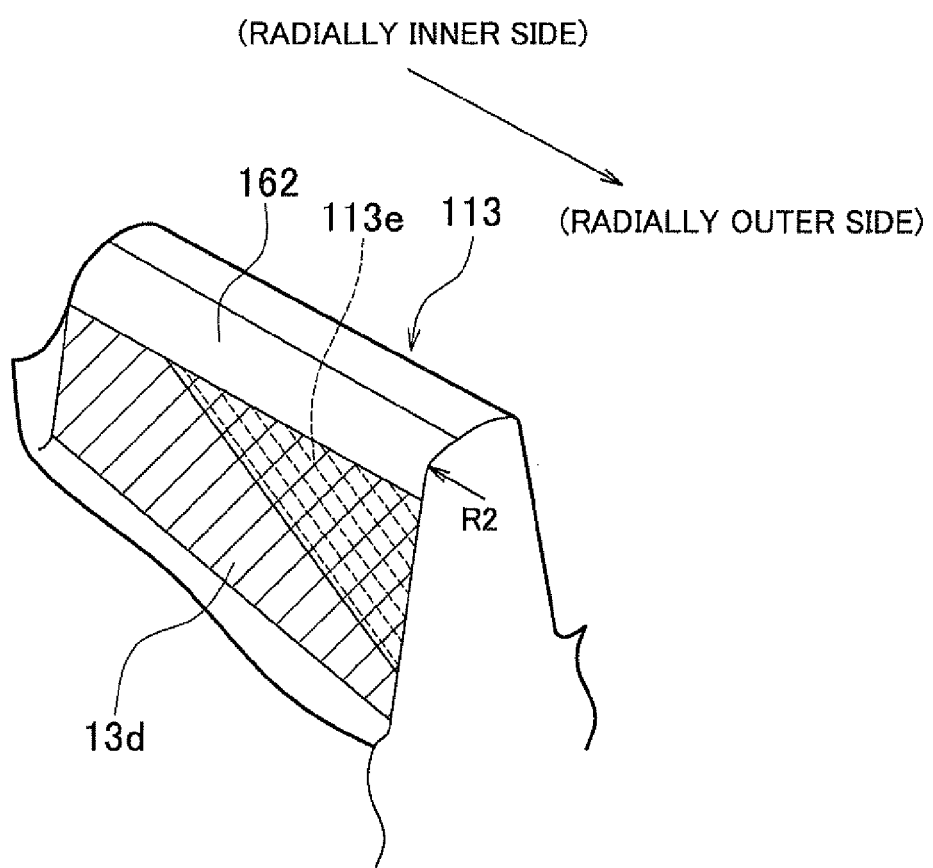
FIG. 11 is a perspective view that schematically shows each spline tooth according to the second comparative example.

FIG. 9 is a view that schematically shows a root portion of each tooth forming portion of a punch according to the first and second comparative example. FIG. 10 is a perspective view that schematically shows each spline tooth according to the first comparative example. FIG. 11 is a perspective view that schematically shows each spline tooth according to the second comparative example. In FIG. 9, the radius R1 of the rounded-portion forming portion 152 of each tooth forming portion 150 of the punch according to the first comparative example is indicated by the continuous line, and a radius R2 of a rounded-portion forming portion 152 of each tooth forming portion 150 of the punch according to the second comparative example is indicated by a long dashed double-short dashed line. In the first comparative example, as shown in FIG. 10, the radius R1 of a rounded portion 162 of each spline tooth 113 is set at a small value (R1<Ro) and is constant. In the second comparative example, as shown in FIG. 11, the radius R2 of the rounded portion 162 of each spline tooth 113 is set at a large value (R2>Ri) and is constant.

As in the first comparative example (see FIG. 10), when the radius R1 of the rounded portion 162 of each spline tooth 113 is small, the area of a tooth flank 113d of each spline tooth 113 is large accordingly. On the other hand, as in the second comparative example (see FIG. 11), when the radius R2 of the rounded portion 162 of each spline tooth 113 is large, the area of a tooth flank 113d of each spline tooth 113 is small accordingly. In FIG. 10 and FIG. 11, the region of the tooth flank 113d of each spline tooth 113 is hatched by continuous lines.

The spline teeth 113 are in mesh with the teeth 14 formed on the end face of the outer ring cylindrical portion 33a of the constant velocity joint 30, and rotational force about the axis is applied from the teeth 14 to the spline teeth 113. Thus, force perpendicular to the tooth flank of each spline tooth 113 mainly acts on the tooth flank. In FIG. 10 and FIG. 11, a region 113e that receives force from the tooth 14 is hatched by dashed lines.

The comparison between the spline tooth 113 in the first comparative example shown in FIG. 10 and the spline tooth 113 in the second comparative example shown in FIG. 11 shows that the area of the tooth flank 113d in the second comparative example is smaller, and the area of the region 113e that receives force from the tooth 14 of the constant velocity joint 30 in the second comparative example is also smaller. Thus, the contact pressure received by each spline tooth 113 increases as the size of the rounded portion 162 increases. Therefore, forming the large rounder portion 162 is disadvantageous in terms of durability.

In contrast to this, in the present embodiment shown in FIG. 8, the area of the tooth flank 13d (indicated by continuous line hatching) of each spline tooth 13 and the area of the region 13e (indicated by dashed line hatching) that receives force from the tooth 14 of the constant velocity joint 30 are values intermediate between those in the first comparative example and those in the second comparative example. Thus, the present embodiment is more advantageous in terms of durability than the second comparative example shown in FIG. 11.

The above description will be summarized as follows. According to the present embodiment, the durability of each spline tooth 13 is lower but the durability of each tooth forming portions 50 of the punch 42 is higher than those in the first comparative example, and the durability of each tooth forming portion 50 of the punch 42 is lower but the durability of each spline tooth 13 is higher than those in the second comparative example. Thus, according to the present embodiment, it is possible to ensure, in a balanced manner, the durability of the punch 42 and the durability of the spline teeth 13.

In addition, in order to ensure, in a balanced manner, the durability of the punch 42 and the durability of the spline teeth 13, the radius of the rounded portion 62 of each spline tooth 13 (that is, the radius of the rounded-portion forming portion 52) may be increased radially outward. However, as shown in FIG. 8, the tooth flank 13d of each spline tooth 13 receives force from the tooth 14 of the constant velocity joint 30, at the region 13e that is located exclusively on a radially outer side portion of the tooth flank 13d. Therefore, forming each rounded portion 62 such that the radius thereof is reduced radially outward is effective in reducing contact pressure at the tooth flank 13d.

The radius Ri at the radially inner end portion and the radius Ro at the radially outer end portion of each rounded-portion forming portion 52 or each rounded portion 62 are desirably set to satisfy a condition expressed by the following Equation 1.

$$1.7R_o < R_i \leq 3.0R_o \qquad \text{Equation 1}$$

The reason why the range is set as described above is as follows. If the radius Ri at the radially inner end portion and the radius Ro at the radially outer end portion are set to satisfy a condition expressed by $R_i \leq 1.7R_o$, the effect of reducing stress at the root portion of each tooth forming portion 50 is reduced. If the radius Ri at the radially inner end portion and the radius Ro at the radially outer end portion are set to satisfy a condition that $R_i > 3.0R_o$, contact pressure that is produced at the tooth flank 13d of each spline tooth 13 increases, which reduces the effect of increasing the durability of the spline teeth 13.

The invention is not limited to the above described embodiment, and various modifications and changes may be made within the scope of the invention described in claims. For example, in the above-described embodiment, the radius of the rounded-portion forming portion 52 of each tooth forming portion 50 and the radius of the rounded portion 62 of each spline tooth 13 change linearly in the radial direction. Alternatively, those radii may change in a curve (nonlinearly). In addition, the detailed structure of the vehicle hub unit, other than the spline teeth 13, is not limited to the above described embodiment, and a known structure may be employed.

According to the invention, it is possible to ensure, in a balanced manner, the durability of the teeth of the machining tool and the durability of the spline teeth formed by the machining tool.

What is claimed is:

1. A vehicle hub unit in which multiple spline teeth that are in mesh with teeth of a constant velocity joint are formed on an axial end face of a hub wheel to which a wheel is fitted, the axial end face facing inward in a vehicle lateral direction, the multiple spline teeth being formed in a circular pattern about an axis of the vehicle hub unit, wherein
   a radius of a rounded portion formed between a tooth flank and a top land of each one of the multiple spline teeth changes in a radial direction about the axis, the radius of the rounded portion reducing outwardly from a radially inner end portion to a radially outer end portion of the respective one of the multiple spline teeth.

2. The vehicle hub unit according to claim 1, wherein a radius (Ro) of the rounded portion at a radially outer end portion of each of the spline teeth and a radius (Ri) of the rounded portion at a radially inner end portion of each of the spline teeth are set to satisfy a condition that $1.7R_o < R_i < 3.0R_o$.

* * * * *